US 7,729,365 B2

(12) United States Patent
Motegi et al.

(10) Patent No.: US 7,729,365 B2
(45) Date of Patent: Jun. 1, 2010

(54) GATEWAY FOR CONTROLLING ELECTRIC EQUIPMENT CONNECTED TO LAN THROUGH WAN

(75) Inventors: Shinji Motegi, Saitama (JP); Hiroki Horiuchi, Saitama (JP)

(73) Assignee: KDDI Corporation, Tokyo (JP)

( * ) Notice: Subject to any disclaimer, the term of this patent is extended or adjusted under 35 U.S.C. 154(b) by 399 days.

(21) Appl. No.: 11/775,577

(22) Filed: Jul. 10, 2007

(65) Prior Publication Data
US 2008/0013554 A1 Jan. 17, 2008

(30) Foreign Application Priority Data
Jul. 12, 2006 (JP) .............................. 2006-191315

(51) Int. Cl.
*H04L 12/28* (2006.01)
(52) U.S. Cl. ...................................... 370/401; 370/352
(58) Field of Classification Search ................. 370/352, 370/400, 392; 709/203, 224
See application file for complete search history.

(56) References Cited

U.S. PATENT DOCUMENTS

| 6,023,724 | A  | * | 2/2000  | Bhatia et al. ................. 709/218 |
| 6,963,925 | B1 | * | 11/2005 | Ishikawa et al. ............. 709/238 |
| 7,006,436 | B1 | * | 2/2006  | Chu et al. ..................... 370/230 |
| 7,120,930 | B2 | * | 10/2006 | Maufer et al. .................. 726/11 |
| 7,274,684 | B2 | * | 9/2007  | Young et al. ................. 370/352 |
| 7,324,531 | B2 | * | 1/2008  | Cho ............................ 370/401 |
| 7,385,975 | B2 | * | 6/2008  | Liu ............................. 370/389 |
| 7,401,118 | B1 | * | 7/2008  | Yokota et al. ................ 709/203 |
| 7,457,293 | B2 | * | 11/2008 | Kokado ....................... 370/392 |
| 7,523,186 | B1 | * | 4/2009  | Waters ........................ 709/223 |
| 7,545,821 | B2 | * | 6/2009  | Sonoda et al. ............... 370/401 |
| 7,613,180 | B2 | * | 11/2009 | Tanaike et al. .............. 370/389 |
| 2002/0103850 | A1 | * | 8/2002 | Moyer et al. ................ 709/202 |
| 2003/0112808 | A1 | * | 6/2003 | Solomon ..................... 370/400 |
| 2003/0145082 | A1 | * | 7/2003 | Son ............................ 709/224 |
| 2003/0161453 | A1 | * | 8/2003 | Veschi ...................... 379/93.05 |
| 2004/0081150 | A1 | * | 4/2004 | Chiang et al. ............... 370/392 |
| 2005/0172024 | A1 | * | 8/2005 | Cheifot et al. .............. 709/225 |
| 2006/0120386 | A1 | * | 6/2006 | Rossi et al. .................. 370/401 |
| 2007/0160034 | A1 | * | 7/2007 | Koretsky ..................... 370/352 |

FOREIGN PATENT DOCUMENTS

JP 2004-208101 A 7/2004

OTHER PUBLICATIONS

Takeshi Saito et al.; "Toshiba network home electric appliances realizing various service fusion"; Toshiba review, vol. 60 No. 7, 2005.
Mayuko Tanaka et al.; " Home network technique aiming at simple security—seamless Plug & Play technique and digital content copyright guard technique-"; Hitachi criticism, Nov. 2004.

* cited by examiner

*Primary Examiner*—Thong H Vu
(74) *Attorney, Agent, or Firm*—Westerman, Hattori, Daniels & Adrian, LLP

(57) ABSTRACT

A gateway controls electric equipment connected to LAN through WAN. The gateway has address mapping table that LAN address corresponds to WAN address, network layer unit for converting source address and destination address in network layer into WAN address for a packet received from LAN, and application layer unit for converting access address in application layer into WAN address for the packet.

22 Claims, 4 Drawing Sheets

GATEWAY FOR CONTROLLING ELECTRIC EQUIPMENT CONNECTED TO LAN THROUGH WAN

PRIORITY CLAIM

The present application claims priority from Japanese Patent Application No. Japanese Patent Application No. 2006-191315 filed on Jul. 12, 2006, which are incorporated herein by reference.

BACKGROUND OF THE INVENTION

1. Field of the Invention

The present invention relates to a gateway and a method for controlling electric equipment connected to LAN (Local Area Network), through WAN (Wide Area Network). In particular, the present invention relates to the gateway and the method for controlling home information appliances (electric equipments) connected to home network, through the Internet.

2. Description of the Related Art

Recently, there are home information appliances equipped with LAN connection interface to be connected to home network. Thereby, data transmitting and receiving through LAN is enabled between these electric equipments. An electric equipment can be operated from other electric equipment. Also, the electric equipment can be connected to WAN such as the Internet, through a gateway connected to LAN. Thereby, the electric equipment can receive content data from WWW (World Wide Web) server connected to the Internet.

Network layer of LAN and network layer of WAN are usually IP (Internet Protocol). On the other hand, application layer of LAN is usually different from application layer of WAN. For example, in many cases, LAN uses UPnP (Universal Plug and Play), and WAN uses SIP (Session Information Protocol).

Not only electric equipments which are compliant with UPnP, but also electric equipments which are non-compliant with UPnP are connected to LAN of home network. For example, electric equipments such as Web camera and ECHONET (Energy Conservation and HOmecare NETwork) white goods are non-compliant with UPnP. Thus, there is a technique to make electric equipment which is non-compliant with UPnP correspond virtually to electric equipment compliant with UPnP, (refer to documents 1 and 2). Based on this technique, electric equipments which are non-compliant with UPnP can be discovered and operated from electric equipments which are compliant with UPnP.

Also, a gateway based on such a technical function can be connected between LAN and WAN. Thereby, electric equipments connected to LAN can be discovered and operated from electric equipments connected through WAN (refer to document 1).

[document 1] Mayuko Tanaka, Chiyo Ono, Hiroshi Yamashita, "home network technique aiming at simple security—seamless Plug & Play technique and digital content copyright guard technique—", Hitachi criticism, November 2004

[document 2] Takeshi Saito, Masao Issiki, Kenichi Sakurada, Toshihiro Fujibayashi, "Toshiba network home electric appliances realizing various service fusion", Toshiba review, Vol. 60 No. 7, 2005

[document 3] Japanese Patent Laid-Open No. 2004-208101

Generally, a packet for operating or controlling electric equipment connected to LAN includes access address in application layer. The access address is URL (Uniform Resource Locator), for example. The access address is usually the same network address. That is to say, it is an address available only in the same LAN. Thus, when this address is utilized in other LAN, it cannot be connected because network addresses are different.

Also, in some cases second electric equipment connected to second LAN receives a packet transmitted from first electric equipment connected to first LAN. In this case, the second electric equipment cannot reply to the source address of the packet. This is because the source address usually shows a network address of the first LAN.

Further, gateway connected to home network usually controls network layers. When the gateway admits passage of the address in the network layer, the access address of all electric equipments in the home network becomes known from the WAN side.

BRIEF SUMMARY OF THE INVENTION

Thus, the object of the present invention is to provide a gateway and a method for controlling electric equipment connected to LAN through WAN.

According to the present invention, the gateway has address mapping table that LAN address corresponds to WAN address, network layer unit for converting source address and destination address in network layer into WAN address for a packet received from LAN, and application layer unit for converting access address in application layer into WAN address for the packet.

It is preferred that the gateway further having unit for receiving a control packet indicating a setting on the address mapping table from other electric equipment or mobile-phone connected through WAN, and the address mapping table being set depending on the designation of the control packet.

It is preferred that the gateway further having access address table for describing access addresses transferable by the application layer unit, and the application layer unit transfers the packet in case the access address included in the packet to be transferred is included in the access address table.

It is preferred that the gateway further having unit for receiving control packet indicating a setting on the access address table from other electric or mobile-phone connected through WAN, and the access address table being set depending on the designation of the control packet.

It is preferred that the network layer of LAN and WAN uses IP (Internet Protocol), the application layer of LAN uses UPnP (Universal Plug and Play), and the application layer of WAN uses SIP (Session Information Protocol).

It is preferred that the network layer unit uses NAT (Network Address Translation) as a function to convert source address.

According to the present invention, the gateway has address mapping table that LAN address corresponds to WAN address, network layer unit for converting source address and destination address in network layer into LAN address for a packet received from WAN, and application layer unit for converting access address in application layer into LAN address for the packet.

It is preferred that the gateway further having unit for assigning a virtual address to the source address when the source address of the packet received from WAN is not described on an address mapping table by WAN, and the source address is set as WAN address, and the virtual address is set as LAN address on the address mapping table.

It is preferred that the gateway further having unit for receiving a control packet indicating a set on the address mapping table from other electric equipment or mobile-phone connected through WAN, and the address mapping table being set depending on the designation of the control packet.

It is preferred that the gateway further having access address table for describing access addresses transferable by the application layer unit, and the application layer unit transfers the packet in case the access address included in the packet to be transferred is included in the access address table.

It is preferred that the gateway further having unit for receiving control packet indicating a set on the access address table from other electric or mobile-phone connected through WAN, and the access address table being set depending on the designation of the control packet.

It is preferred that the network layer of LAN and WAN uses IP (Internet Protocol), the application layer of LAN uses UPnP (Universal Plug and Play), and the application layer of WAN uses SIP (Session Information Protocol).

It is preferred that the network layer unit uses NAT (Network Address Translation) as a function to convert source address.

According to the present invention, a method for making a computer to function as the gateway has an address mapping table that shows LAN address and its corresponding WAN address, a first step of converting source address and destination address in network layer into WAN address for a packet received from LAN, and a second step of converting access address in application layer into WAN address for the packet.

It is preferred that the method further having the step of receiving a control packet indicating a setting on the address mapping table from other electric equipment or mobile-phone connected through WAN, and the address mapping table being set depending on the designation of the control packet.

It is preferred that the method further having access address table for describing access addresses transferable by the application layer, and the second step transfers the packet in case the access address included in the packet to be transferred is included in the access address table.

According to the present invention, a method for making a computer to function as the gateway has an address mapping table that shows LAN address and its corresponding WAN address, a first step of converting source address and destination address in network layer into LAN address for a packet received from WAN, and a second step of converting access address in application layer into LAN address for the packet.

It is preferred that the method further having the step of assigning a virtual address to the source address when the source address of the packet received from WAN is not described on an address mapping table by WAN, and the source address is set as WAN address, and the virtual address is set as LAN address on the address mapping table.

It is preferred that the method further having the step of receiving a control packet indicating a set on the address mapping table from other electric equipment or mobile-phone connected through WAN, and the address mapping table being set depending on the designation of the control packet.

It is preferred that access address table for describing access addresses transferable by the application layer is further provided, and the application layer transfers the packet in case the access address included in the packet to be transferred is included in the access address table.

According to the gateway and the method of the present invention, electric equipment connected to LAN can be controlled through WAN.

DETAILED DESCRIPTION OF THE INVENTION

Figure 1:
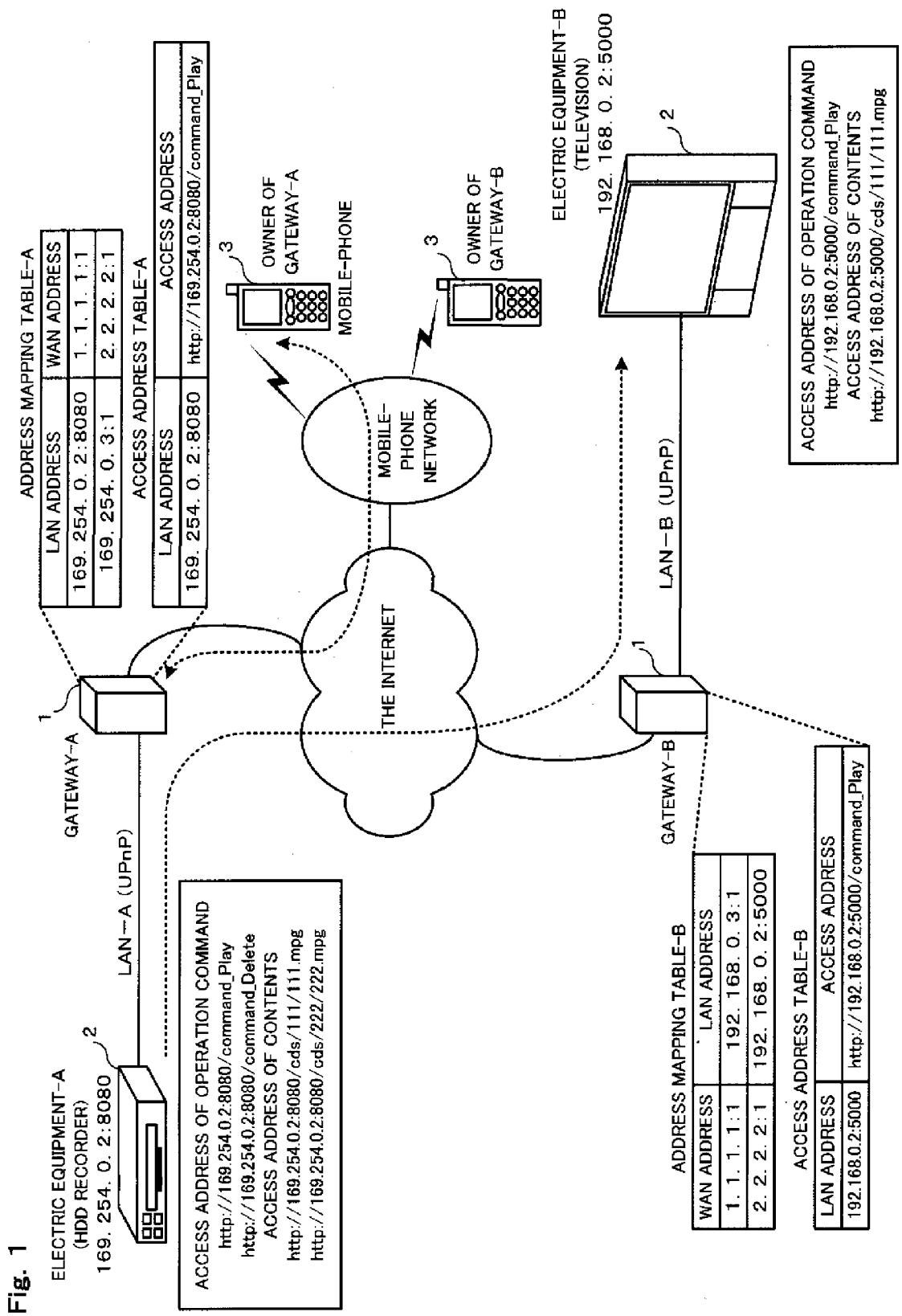
FIG. 1 shows a system configuration of the present invention.

FIG. 1 shows a system configuration of the present invention.

According to the system in FIG. 1, electric equipment 2-A such as hard disk (HDD) recorder is connected to LAN-A of home network. Electric equipment 2-A has IP address "169.254.0.2" and port number "8080". Address is shown either by IP address only or by a set of IP address and port number.

The application layer of electric equipment 2-A applies UPnP, and electric equipment 2-A can be controlled from other electric equipment. Therefore, electric equipment 2-A has an own access address in the application layer. The access address is shown by URL. The other electric equipment connected to LAN-A can control electric equipment 2-A by using own access address of electric equipment 2-A. Also, the electric equipment which received a packet including the own access address can know a controllable address of the other electric equipment.

The list of access addresses which electric equipment 2-A provides for other electric equipment connected to LAN-A is shown as follows.

Own access addresses of operation command

---
http://169.254.0.2:8080/command_Play
http://169.254.0.2:8080/command_Delete

---

Own access addresses of contents

---
http://169.254.0.2:8080/cds/111/111.mpg
http://169.254.0.2:8080/cds/222/222.mpg

---

Gateway 1-A is connected between LAN-A of home network and WAN of the Internet. Gateway 1-A is connected to other gateway 1-B through WAN. Also, gateway 1-A can communicate with the portable telephone of the owner of the gateway 1-A through WAN.

Gateway 1-A has address mapping table A and access address table A. According to address mapping table A, a LAN address corresponds to a WAN address. Table 1 is an example of the address mapping table of gateway 1-A.

TABLE 1

| LAN address | WAN address |
|---|---|
| 169.254.0.2:8080 | 1.1.1.1:1 |
| 169.254.0.3:1 | 2.2.2.2:1 |

According to table 1, LAN address "169.254.0.2: 8080" of electric equipment 2-A corresponds to WAN address "1.1.1.1: 1". Also, WAN address "2.2.2.2: 1" for electric equipment 2-B corresponds to LAN address "169.254.0.3:1" of gateway 1-A. "169.254.0.3:1" is virtual addresses for electric equipment 2-B.

Access address table A describes an access address enabling control from WAN. Table 2 is an example of access addresses of gateway 1-A.

TABLE 2

| LAN address | Access address |
|---|---|
| 169.254.0.2:8080 | http://169.254.0.2:8080/command_Play |

According to table 2, an access address "http://169.254.0.2: 8080/command_Play" is allowed for electric equipment 2-A of LAN address "169.254.0.2:8080".

On the other hand, electric equipment 2-B is equipment such as a television, for example, and is connected to gateway 1-B through LAN-B. Electric equipment 2-B has IP address "192.168.0.2", and port number "5000".

Gateway 1-B has an address mapping table, and a WAN address corresponds to a LAN address. Table 2 is an example of address mapping table of gateway 1-B.

TABLE 3

Address corresponding table B

| WAN address | LAN address |
|---|---|
| 1.1.1.1:1 | 192.168.0.3:1 |
| 2.2.2.2:1 | 192.168.0.2:5000 |

According to table 3, LAN address "192.168.0.2: 5000", of electric equipment 2-B corresponds to "2.2.2.2: 1" in WAN. Also, WAN address "1.1.1.1: 1" for electric equipment 2-A corresponds to LAN address "192.168.0.3: 1" of gateway 1-B. "192.168.0.3: 1" is virtual address for electric equipment 2-A.

An electric equipment which is compliant with UPnP usually communicates only with electric equipment connected to the same LAN. Thus, one electric equipment makes all access address known to the other electric equipments connected to the same LAN. Thereby, the other electric equipments operates the one electric equipment, and contents delivery can be controlled. Thus, communication is enabled only when a network address of a destination address is same as the network address of the own address. Usually, a network address in LAN is different from a network address in WAN.

Gateway 1-A of the present invention assigns a virtual address of electric equipment 2-B in WAN for a communication interface of LAN-A side. This virtual address is set in the address mapping table, and is treated as electric equipment 2-B in LAN-A.

Gateway 1-A transfers the packet which a destination address is this virtual address, to electric equipment 2-B through WAN. When an access address included in a packet received from electric equipment 2-A is described on the access address table, gateway 1-A transfers the packet to WAN. For example, the access address table can be changed by a control packet sent from portable telephone. The owner of gateway 1-A has the portable telephone.

Figure 2:
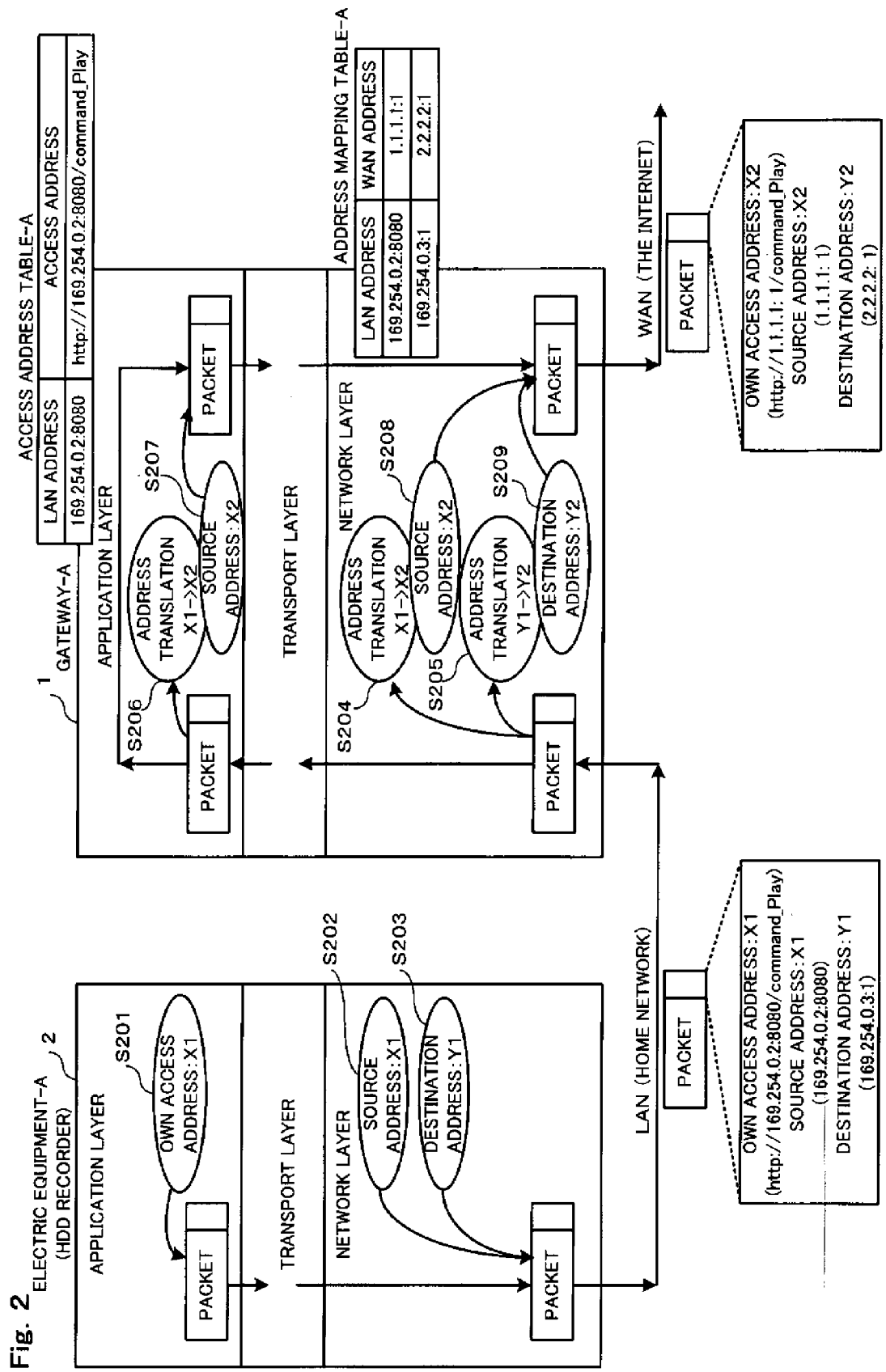
FIG. 2 shows first sequence to transfer a packet from electric equipment to gateway.

FIG. 2 shows first sequence to transfer a packet from electric equipment to gateway. In FIG. 2, electric equipment 2-A of an HDD recorder connected to LAN-A sends an own access address to electric equipment 2-B of television connected to LAN-B through the Internet.

(S201) The application layer of electric equipment 2-A controls so that the packet includes the list of the own access address. The packet is informed to the network layer through the transport layer. The example of the list of the own access address is shown as follows.

Own access addresses of operation commands http://169.254.0.2:8080/command_Play
http://169.254.0.2:8080/command_Delete Own access addresses of contents http://169.254.0.2:8080/cds/111/111.mpg
http://169.254.0.2:8080/cds/222/222.mpg (S202) The network layer of electric equipment 2-A controls so as to include source address X1 "169.254.0.2:8080" of electric equipment 2-A in the packet.

(S203) The network layer of electric equipment 2-A further controls to include destination address Y1 of other electric equipment 2-B in the packet. Here, virtual address "169.254.0.3: 1" is assigned as an address of other electric equipment 2-B in LAN-A. Thus, the network layer of electric equipment 2-A controls to include destination address Y1 "169.254.0.3: 1", in the packet. The packet is transferred from electric equipment 2-A to gateway 1-A through LAN-A.

(S204) The network layer of gateway 1-A pulls out source address X1 "169.254.0.2: 8080" from the received packet. According to the address mapping table, LAN address "169.254.0.2:8080" corresponds to WAN address "1.1.1.1: 1". Thus, source address X1 "169.254.0.2: 8080" of the packet is converted into X2 "1.1.1.1:1".

(S205) The network layer of gateway 1-A also pulls out destination address Y1 "169.254.0.3:1" from the received packet. According to the address mapping table, LAN address "169.254.0.3:1" corresponds to WAN address "2.2.2.2:1". Thus, destination address Y1 "169.254.0.3: 1" of the packet is converted into Y2 "2.2.2.2: 1". The packet is informed to the application layer through the transport layer.

(S206) The lists (1)-(4) of the access addresses are included in the packet received from electric equipment 2-A. Among the access addresses of these lists, only access address included in the access address table is selected. It controls so that only selected access address is included in the packet. That is to say, the packet includes only access address of (1), and (2)-(4) are deleted.

Then, the application layer of gateway 1-A pulls out access address X1 "http//169.254.0.2: 8080/command_Play" from the received packet. According to the address mapping table, LAN address "169.254.0.2:8080" corresponds to WAN address "1.1.1.1:1". Thus, for access address X1 "http://169.254.0.2:8080/command_Play" in the packet, the part of IP address and port number is converted into X2 "1.1.1.1:1". That is to say, access address X2 becomes "http://1.1.1.1:1/command_Play".

(S207) The application layer of gateway 1-A controls so that the packet includes access address X2 "http://1.1.1.1:1/command_Play". The packet is informed to the network layer through the transport layer.

(S208) The network layer of gateway 1-A controls so as to include source address X2 "1.1.1.1:1" in the packet.

(S209) The network layer of gateway 1-A also controls so as to include destination address Y2 "2.2.2.2:1" in the packet.

The packet is transferred from gateway 1-A to gateway 1-B through the Internet.

Figure 3:
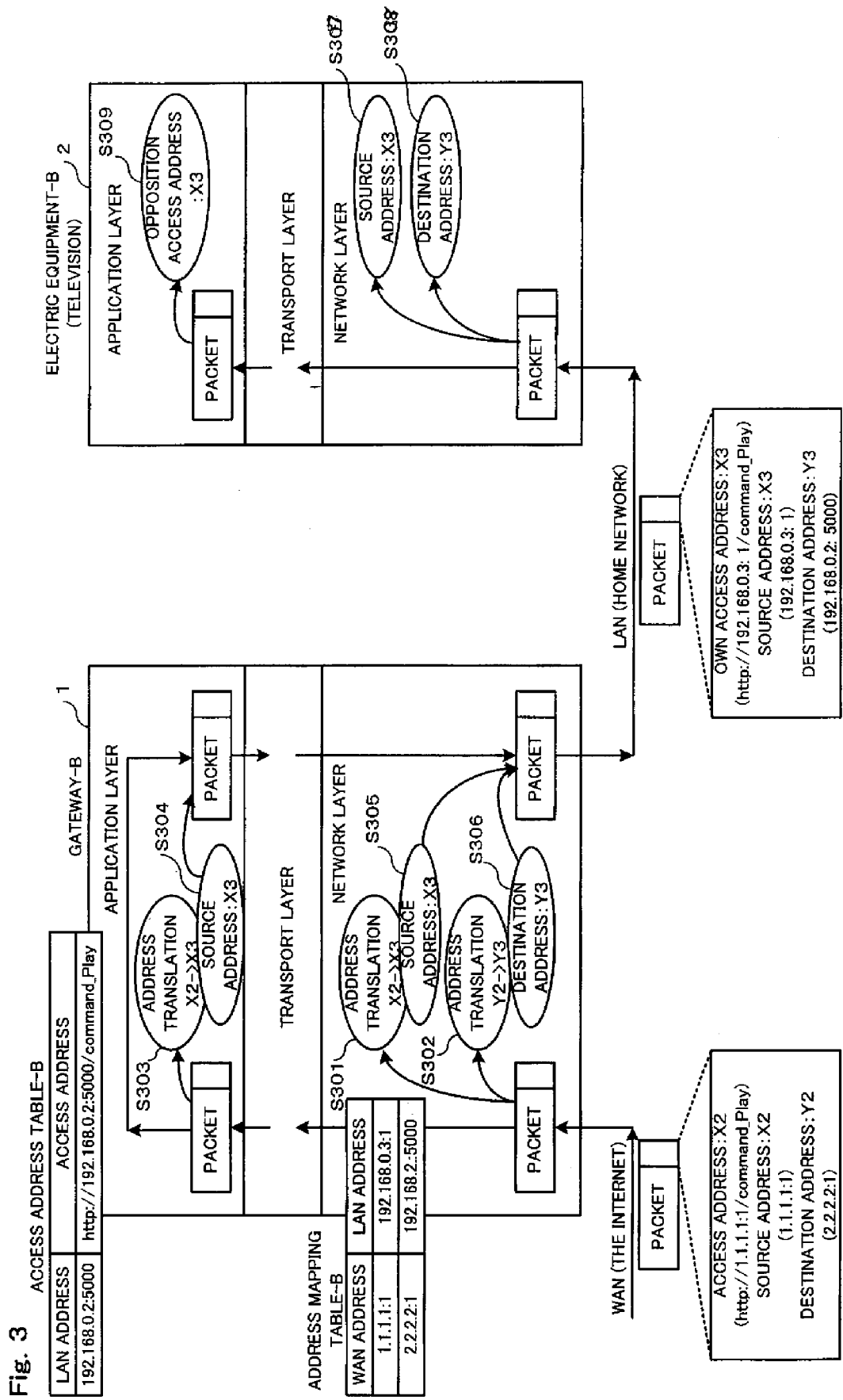
FIG. 3 shows second sequence to transfer a packet from gateway to electric equipment.

FIG. 3 shows second sequence to transfer a packet from electric equipment to gateway.

In FIG. 3, electric equipment 2-B of television connected to LAN-B receives an access address from electric equipment 2-A of HDD recorder through the Internet.

(S301) The network layer of gateway 1-B pulls out source address X2 "1.1.1.1:1" from the received packet. According to the address mapping table, WAN address "1.1.1.1: 1" corresponds to LAN address "192.168.0.3: 1". Thus, source address X2 "1.1.1.1:1" of the packet is converted into X3 "192.168.0.3:1".

(S302) The network layer of gateway 1-B also pulls out destination address Y2 "2.2.2.2: 1" from the received packet. According to the address mapping table, WAN address "2.2.2.2:1" corresponds to LAN address "169.254.0.2:5000". Thus, destination address Y2 "2.2.2.2:1" of the packet is converted into Y3 "192.168.0.2:5000". The packet is transferred to the application layer through the transport layer.

(S303) The application layer of gateway 1-B pulls out access address X2 "http//1.1.1.1: 1/command_Play" from the received packet. According to the address mapping table, WAN address "1.1.1.1:1" corresponds to LAN address "192.168.0.3:1". Thus, for access address X2 "http://1.1.1.1: 1/command_Play" of the packet, the part of IP address and port number is converted into "192.168.0.3:1". That is to say, access address X3 becomes "http://192.168.0.3:1/command_Play".

(S304) The application layer of gateway 1-B controls so that the packet includes access address X3 "http://192.168.0.3:1/command_Play". The packet is transferred to the network layer through the transport layer.

(S305) The application layer of gateway 1-A controls so as to include source address X3 "192.168.0.3:1" in the packet.

(S306) The application layer of gateway 1-A also controls so as to include destination address Y3 "192.168.0.2: 5000" in the packet.

The packet is transferred from gateway 1-B to electric equipment 2-B through LAN-B.

(S307) The network layer of electric equipment 2-B pulls out source address X3 "192.168.0.3:1" from the receive packet.

(S308) The network layer of electric equipment 2-B also pulls out destination address Y3 "192.168.0.2:5000" from the received packet. The packet is informed to the application layer through the transport layer.

(S309) The application layer of electric equipment 2-B pulls out access address X3 "http://192.168.0.3:1/command_Play" from the received packet.

Figure 4:
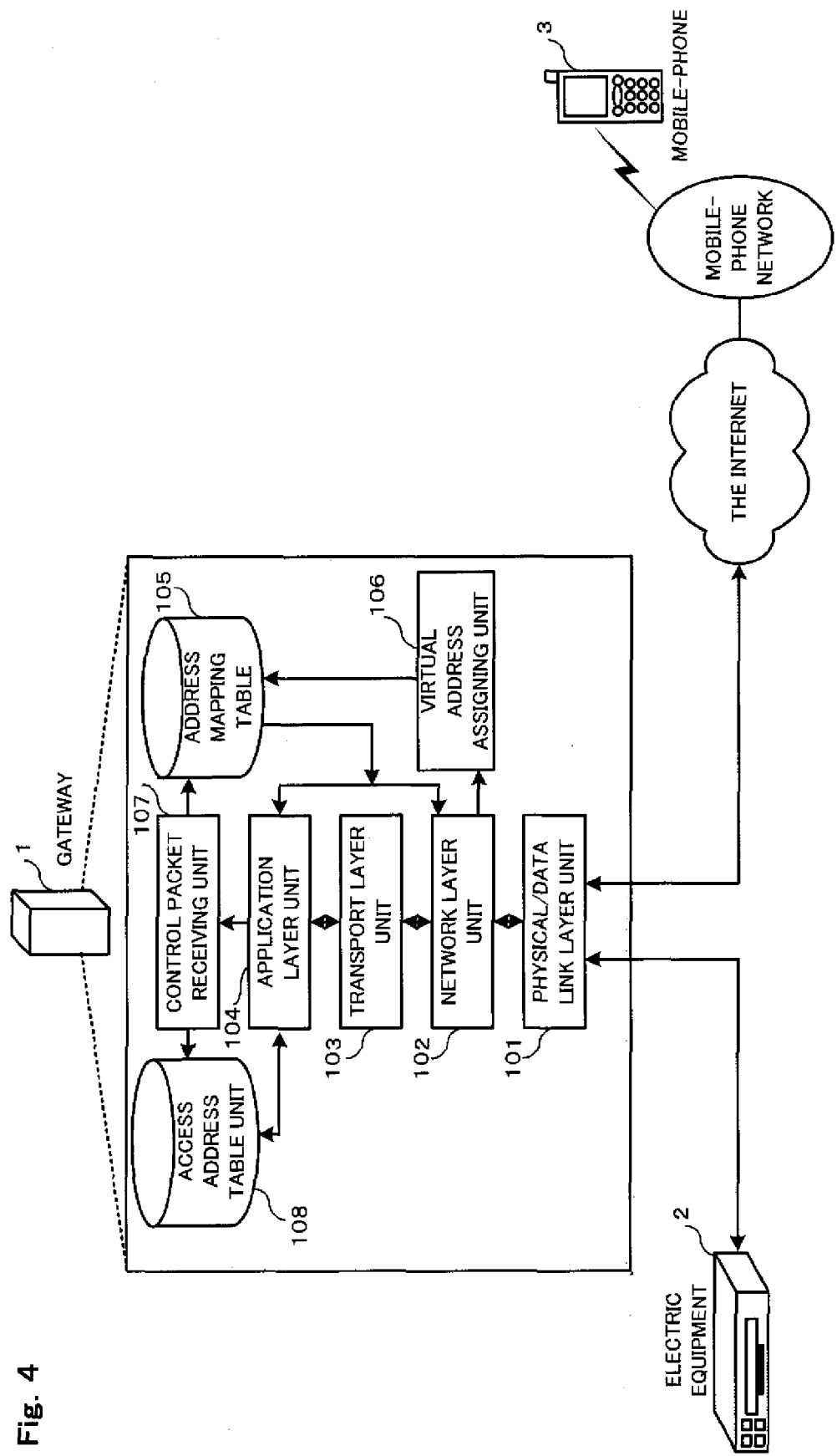
FIG. 4 shows functional configuration of the gateway of the present invention.

FIG. 4 shows functional configuration of the gateway of the present invention.

Gateway 1 in FIG. 4 has physics/data link layer unit 101, network layer unit 102, transport layer unit 103, application layer unit 104, address mapping table unit 105, virtual address assigning unit 106, control packet receiving unit 107 and access address table unit 108. These function unit is realized by executing a computer on-boarded in gateway 1.

Physics/data link layer unit 101 has at least one communication interface, and these interfaces is connected to LAN and WAN.

For a packet received from LAN, network layer unit 102 converts source address and destination address in the network layer into WAN address, by using address mapping table unit 105. Also, for a packet received from WAN, it converts source address and destination address in the network layer into LAN address, by using address mapping table unit 105. Further, the network layer for LAN and WAN uses IP.

For network layer process unit 102, the function for converting source address may use existing NAT.

For a packet received from LAN, application layer unit 104 converts access address in the application layer into WAN address, by using address mapping table unit 105. Also, for a packet received from LAN, it converts access address in the application layer into LAN address, by using address mapping table unit 105. Further, the application layer of LAN uses UPnP, and the application layer of WAN uses SIP.

Address mapping table unit 105 stores the address mapping table, and it makes WAN address correspond to LAN address.

Access address table unit 108 stores the access address table, and it describes access addresses transferable by application layer unit 104.

When source address of a packet received from WAN is not described in the address mapping table, virtual address assigning unit 106 assigns a virtual address to the source address. And, virtual address assigning unit 106 sets "source address: WAN address" and "virtual address: LAN address" to the address mapping table. The virtual address is an address that is assigned to communicate in LAN to the source address of WAN.

Also, virtual address assigning unit 106 determines whether the virtual address is assigned to the source address. It is assumed that gateway 1 assigns a virtual address in LAN to all packets received from WAN. In this case, all electric equipment connected to LAN becomes well known to all source electric equipments of the packet received from WAN. Thus, by the source address of the packet received from WAN, it is determined whether it is admitted or prohibited. Authorization/non-authorization of the connection is meant whether virtual address assignment unit 106 assigns a virtual address to the source address of the packet received from WAN. Thus, is not necessary to send and receive ID or password to certify the other electric equipment.

Control packet receiving unit 107 receives a control packet indicating a set on the address mapping table from other electric equipment connected through WAN. And the address mapping table is set based on the designation of the control packet. Thereby, remote electric equipment can control authorization/suppression of the connection.

Also, control packet receiving unit 107 receives the control packet indicating a set on the access address table from other electric equipment such as mobile-phone connected through WAN. And the access address table is set based on the control packet. Thereby, authorization/suppression of the use of each access address can be controlled from remote electric equipment or portable telephone.

As mentioned above in detail, according to the gateway and the method of the present invention, electric equipment connected to LAN can be controlled through WAN.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A gateway for controlling electric equipment connected to LAN, through WAN, the gateway comprising:
   an address mapping table in which LAN addresses defined in a network layer of the LAN correspond to WAN addresses defined in a network layer of the WAN,
   network layer means for converting, according to the address mapping table, a source address and a destination address in the network layer of the LAN into WAN addresses in the network layer of the WAN, for a packet received from the LAN, and
   application layer means for converting, according to the address mapping table, the source address in the network layer of the LAN which is included in an access address defined in an application layer of the LAN into a WAN address in the network layer of the WAN, for the packet, to thereby modify the access address,
   wherein the source address is a real address of a source which is the electric equipment, and the destination address is a virtual address of a destination which is connected with another LAN that is connected with the WAN,
   the source is accessed from the destination via the WAN, to thereby allow the destination to control the source in a manner identified by the access address.

2. The gateway as claimed in claim 1, further comprising means for receiving a control packet indicating a setting on the address mapping table from other electric equipment or mobile-phone connected through the WAN,
   wherein the address mapping table is set depending on designation of the control packet.

3. The gateway as claimed in claim 1, further comprising an access address table for describing access addresses transferable by the application layer means,
   wherein the application layer means transfers the packet when the access address included in the packet to be transferred is included in the access address table.

4. The gateway as claimed in claim 3, further comprising means for receiving control packet indicating a setting on the access address table from other electric or mobile-phone connected through the WAN,
   wherein the access address table is set depending on designation of the control packet.

5. The gateway as claimed in claim 1, wherein the network layers of the LAN and the WAN use IP (Internet Protocol), the application layer of the LAN uses UPnP (Universal Plug and Play), and the application layer of the WAN uses SIP (Session Information Protocol).

6. The gateway as claimed in claim 1, wherein the network layer means uses NAT (Network Address Translation) to convert the source address.

7. A gateway for controlling electric equipment connected to LAN, through WAN, the gateway comprising:
   an address mapping table in which LAN addresses defined in a network layer of the LAN correspond to WAN addresses defined in a network layer of the WAN,
   network layer means for converting, according to the address ma in table, a source address and a destination address in the network layer of the WAN into a LAN source-address and a LAN destination-address in the network layer of the LAN, respectively, for a packet received from the WAN, and
   application layer means for converting, according to the address mapping table, the destination address in the network layer of the WAN which is included in an access address defined in an application layer of the WAN into a LAN address in the network layer of the LAN, for the packet, to thereby modify the access address,
   wherein the LAN source-address is a virtual address of a source which is connected with another LAN that is connected with the WAN, and the LAN destination-address is a real address of a destination which is the electric equipment,
   the destination is accessed from the source via the WAN, to thereby allow the source to control the destination in a manner identified by the access address.

8. The gateway as claimed in claim 7, further comprising means for assigning a virtual address to the source address when the source address of the packet received from the WAN is not described on the address mapping table,
   wherein the source address is set as a WAN address, and the virtual address is set as a LAN address, both on the address mapping table.

9. The gateway as claimed in claim 7, further comprising means for receiving a control packet indicating a setting on the address mapping table from other electric equipment or mobile-phone connected through the WAN, and
   wherein the address mapping table is set depending on designation of the control packet.

10. The gateway as claimed in claim 7, further comprising an access address table for describing access addresses transferable by the application layer means,
    wherein the application layer means transfers the packet when the access address included in the packet to be transferred is included in the access address table.

11. The gateway as claimed in claim 10, further comprising means for receiving control packet indicating a setting on the access address table from other electric or mobile-phone connected through the WAN, and
    wherein the access address table is set depending on designation of the control packet.

12. The gateway as claimed in claim 7, wherein the network layers of the LAN and the WAN use IP (Internet Protocol), the application layer of the LAN uses UPnP (Universal Plug and Play), and the application layer of the WAN uses SIP (Session Information Protocol).

13. The gateway as claimed in claim 7, wherein the network layer means uses NAT (Network Address Translation) to convert the source address.

14. A method for operating a computer to function as a gateway for controlling electric equipment connected to LANA through WAN, said method comprising:
    a first step of converting, according to an address mapping table in which LAN addresses defined in a network layer of the LAN correspond to WAN addresses defined in a network layer of the WAN, a source address and a destination address in the network layer of the LAN into WAN addresses in the network layer of the WAN, for a packet received from the LAN, and
    a second step of converting, according to the address mapping table, the source address in the network layer of the LAN which is included in an access address defined in an application layer of the LAN into a WAN address in the network layer of the WAN, for the packet, to thereby modify the access address,
    wherein the source address is a real address of a source which is the electric equipment, and the destination address is a virtual address of a destination which is connected with another LAN that is connected with the WAN, the source is accessed from the destination via the WAN, to thereby allow the destination to control the source in a manner identified by the assess address.

15. The method as claimed in claim 14, further comprising a step of receiving a control packet indicating a setting on the address mapping table from other electric equipment or mobile-phone connected through the WAN, wherein the address mapping table is set depending on designation of the control packet.

16. The method as claimed in claim 14, further comprising an access address table for describing access addresses transferable by the application layer, and the second step is implemented to transfer the packet when the access address included in the packet to be transferred is included in the access address table.

17. A method for operating a computer to function as a gateway for controlling electric equipment connected to LAN, through WAN, the method comprising:

a first step of converting, according to an address mapping table in which LAN addresses defined in a network layer of the LAN correspond to WAN addresses defined in a network layer of the WAN, a source address and a destination address in the network layer of the WAN into a LAN source-address and a LAN destination-address in the network layer of the LAN, respectively, for a packet received from the WAN, and a second step of converting, according to the address mapping table, the destination address in the network layer of the WAN which is included in an access address defined in an application layer of the WAN into a LAN address in the network layer of the LAN, for the packet, to thereby modify the access address, wherein the LAN source-address is a virtual address of a source which is connected with another LAN that is connected with the WAN, and the LAN destination-address is a real address of a destination which is electric equipment, the destination is accessed from the source via the WAN, to thereby allow the source to control the destination in a manner identified by the access address.

18. The method as claimed in claim 17, further comprising a step of receiving a control packet indicating a setting on the address mapping table from other electric equipment or mobile-phone connected through the WAN, wherein the address mapping table is set depending on designation of the control packet.

19. The method as claimed in claim 17, further comprising a step of assigning a virtual address to the source address when the source address of the packet received from the WAN is not described on the address mapping table, wherein the source address is set as a WAN address, and the virtual address is set as a LAN address, both on the address mapping table.

20. The method as claimed in claim 17, wherein the second step is implemented to transfer the packet when the access address included in the packet to be transferred is included in an access address table for describing access address transferable by the application layer.

21. A method of allowing a plurality of devices to be mutually controlled, the devices being connected with a plurality of LANs (Local Area networks), respectively, the LANs being interconnected via a WAN (Wide Area Network), wherein the plurality of LANs include a first LAN and a second LAN, the plurality of devices include a first device which is connected with the first LAN, and a second device which is connected with the second LAN, the first device is controlled by the second device, with the first device is accessed from the second device via the WAN, the first device is configured to transmit a first packet to the second device, prior to the control by the second device, with the first device acting as a source, the second device acting as a destination, the first device transmits the first packet to the second device, with the first packet including a first-LAN IP source-address which is a real IP address of the first device in a network layer of the first LAN, a first-LAN IP destination-address which is a virtual IP address of the second device in the network layer of the first LAN, and an access URL (Uniform Resource Locator) address which is a first-LAN URL address in an application layer of the first LAN, the access URL address identifies a manner in which the second device controls the first device, and the access URL address includes the first-LAN IP source-address, the method comprising the steps of:

according to an address mapping table in which the first-LAN IP source-address corresponds to a WAN IP source-address which is an IP address of the first device in a network layer of the WAN, and in which the first-LAN IP destination-address corresponds to a WAN IP destination-address which is an IP address of the second device in the network layer of the WAN, converting the first-LAN IP source-address and the first-LAN IP destination-address into the WAN IP source-address and the WAN IP destination-address, respectively, for the first packet; and according to the address mapping table, converting the first-LAN IP source-address included in the access URL address into the WAN IP source-address, for the first packet, to thereby modify the access URL address.

22. The method as claimed in claim 21, wherein the second device transmits a second packet to the first device, after reception of the first packet, with the second device acting as a source, the first device acting as a destination, the method further comprising the steps of:

according to the address mapping table, converting a WAN IP source-address which is an address of the second device in the network layer of the WAN and a WAN IP destination-address which is an address of the first device in the network layer of the WAN into a first-LAN IP source-address which is a virtual address of the second device in the network layer of the first LAN and a second-LAN IP destination-address which is a real address of the first device in the network layer of the first LAN, respectively, for the second packet; and according to the address mapping table, converting the WAN IP destination-address included in the access URL address into the first-LAN IP destination-address, for the second packet, to thereby modify the access URL address.

* * * * *